United States Patent [19]
Doolittle

[11] 3,827,660
[45] Aug. 6, 1974

[54] AIRCRAFT ARRESTING APPARATUS

[75] Inventor: Donald B. Doolittle, Wilmington, Del.

[73] Assignee: All American Industries, Inc., Wilmington, Del.

[22] Filed: Mar. 29, 1973

[21] Appl. No.: 345,877

Related U.S. Application Data

[63] Continuation-in-part of Ser. No. 312,254, Dec. 5, 1972.

[52] U.S. Cl............................................ 244/110 C
[51] Int. Cl............................................ B64f 1/02
[58] Field of Search...... 244/110, 63, 110 C, 110 A, 244/110 R

[56] References Cited
UNITED STATES PATENTS

| | | | |
|---|---|---|---|
| 2,450,328 | 9/1948 | Cotton | 244/110 R |
| 2,859,928 | 11/1958 | Snow | 244/110 C |
| 3,454,244 | 7/1969 | Walander | 244/110 C |
| 3,468,500 | 9/1969 | Carlsson | 244/110 C |

FOREIGN PATENTS OR APPLICATIONS

| | | | |
|---|---|---|---|
| 1,526,502 | 4/1968 | France | 244/110 C |

*Primary Examiner*—Trygve M. Blix
*Assistant Examiner*—Paul E. Sauberer
*Attorney, Agent, or Firm*—Connolly and Hutz

[57] ABSTRACT

A compound array of vertically deployed open loops of strong inelastic webbing having a maximum dimension slightly smaller than the wingspan of the aircraft to be arrested are detachably hung from a suspension line stretched above and across the runway. The array includes a number of laterally overlapped net elements which present enough loops to seucrely engage and restrain an aircraft which penetrates any portion of the barrier. Slide connectors attach lower portions of the loops to a rearwardly deployed cross runway pendant connected between a pair of energy absorbing devices. When an aircraft impinges upon the barrier, the loops break away from the suspension line and freely move to engage the stronger larger dimensional portions of the aircraft from behind and below it. The loops are conveniently deployed in a pentagonal configuration with their peaked tops connected to the suspension line, their sides breakably connected to each other and bottoms attached by slide connectors to a steel cross runway pendant, which can be optionally used for hook arrestment when the barrier is lowered. The nose wheels pass over and clear the cross runway pendant before the aircraft engages the deployed barrier and its pendant anchored loops, which pull upwardly upon the pendant. The slide connectors are capable of considerable elongation without breaking when a predetermined force exceeding a safe holding force for their attached loops engaged aircraft portion is applied to them. When the elongation brings a sufficient number of loops into engagement, the connectors stop elongating and hold, thus applying substantially safe balanced restraint upon the engaged portions of the aircraft. The elongation is accomplished by stitched folded straps of an unyielding material or by use of a yielding material such as undrawn nylon or a low modulus of elasticity metal, such as annealed stainless steel. The elongatable or extensible connectors are assembled from disconnectable parts to facilitate removal and replacement after permanent distortion. The pendant is coated with an antifriction polymeric material to facilitate lateral sliding adjustment of the connectors and loops.

30 Claims, 15 Drawing Figures

PATENTED AUG 6 1974
3,827,660
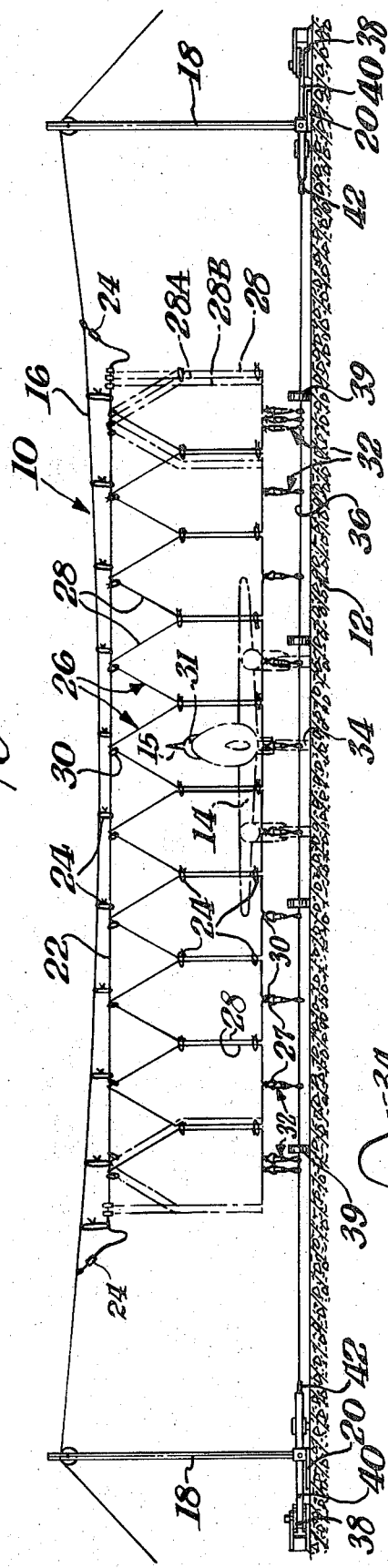
Fig.1.
Fig.2.
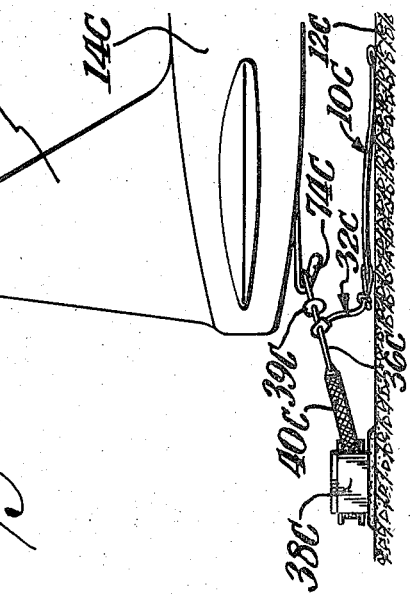
Fig.15.

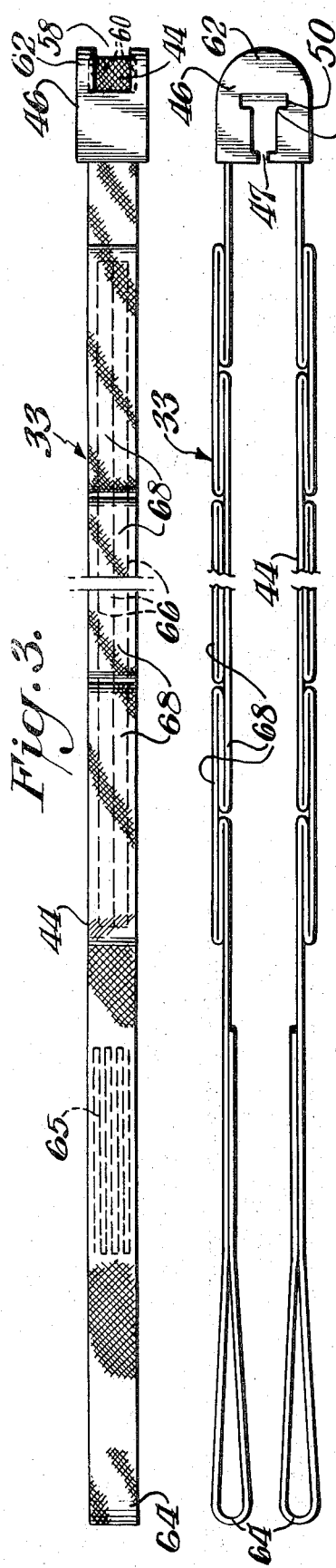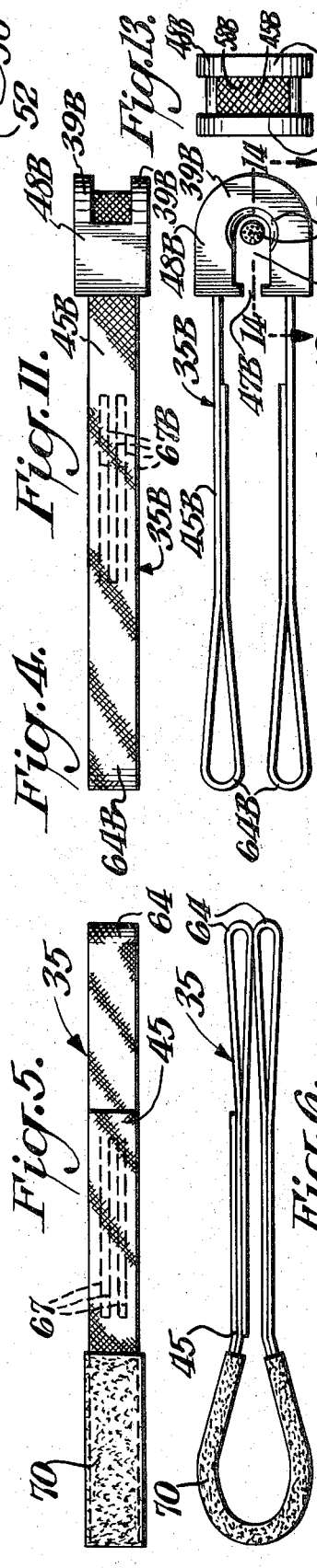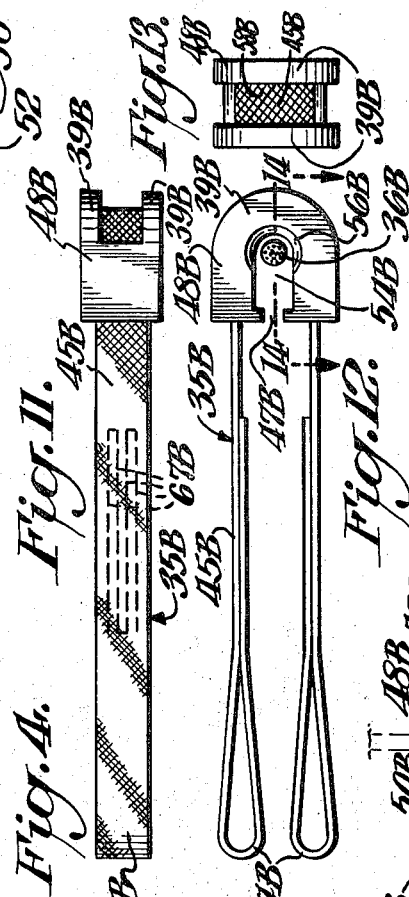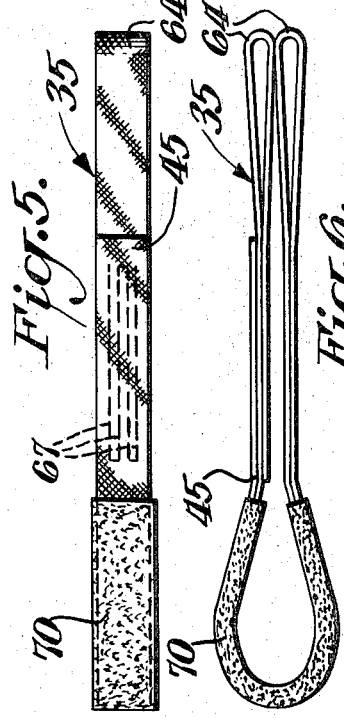

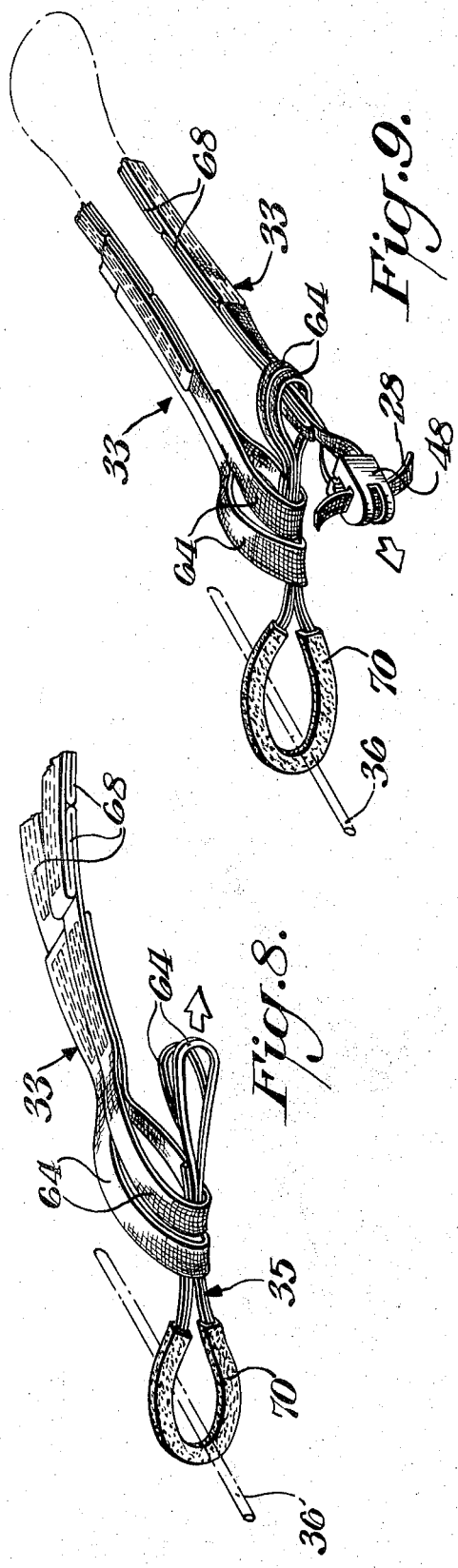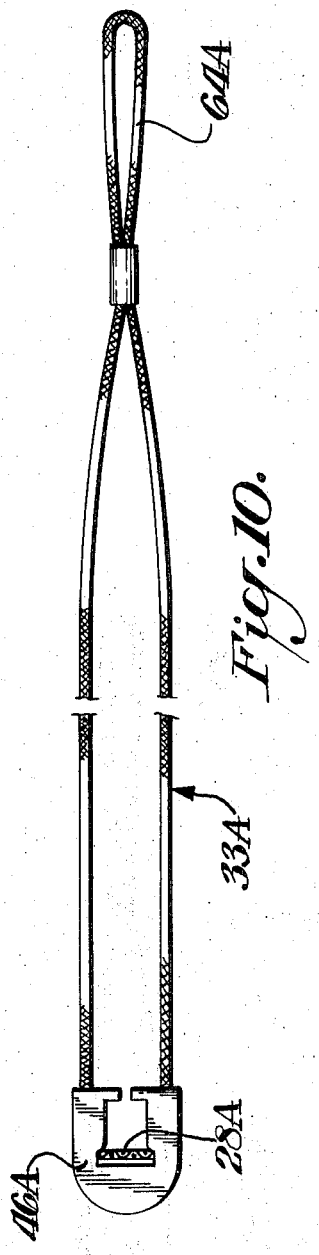

AIRCRAFT ARRESTING APPARATUS

CROSS-REFERENCE TO RELATED APPLICATION

This application is a continuation-in-part of copending application Ser. No. 312,254 filed Dec. 5, 1972, by the same inventor.

BACKGROUND OF THE INVENTION

Compound barrier nets for arresting landing aircraft should distribute loads and shocks fairly evenly and should not damage protruding weaker portions of the aircraft or injure the pilot. Some of them have a multiplicity of cross runway pendants which complicate optional arrestment by a depending hook. An object of this invention is to provide a compound barrier net for arresting aircraft which very evenly distributes the arresting load to larger dimensional and stronger portions of the aircraft and which minimizes the required number of cross runway pendants to facilitate optional hook arrestment.

SUMMARY OF THE INVENTION

In accordance with this invention an array of flexible aircraft arresting loops slightly smaller than the aircraft wingspan are detachably suspended across the runway with their lower ends connected to a cross runway linear component which is attached to an energy absorbing device. Enough loops are provided to engage a substantial number of them with an aircraft which impinges upon and penetrates any portion of the barrier. The loops then break away from the suspension line and move about larger dimensional portions of the aircraft and apply the restraint of the energy absorbing device from behind and below it. They are, for example, efficiently deployed in a peaked configuration with their sides breakably connected to each other in a plurality of overlapping lateral arrays. The lower ends of each loop are connected to a cross runway pendant by elongatable connectors which are capable of considerable elongation without breaking above a predetermined applied force and which hold and restrain the aircraft when the force applied to the particular connector is below the predetermined force level which is designed to be within the safe holding capacity of the loop material and not to damage engaged portions of the arrested aircraft. The initially stressed connectors elongate until enough additional restraining loops are brought into engagement to share the restraining load and lower the stress in individual connectors below the elongating level. The elongatable or extensible connectors comprise, for example, breakably stitched folded straps of unyielding material for use a yielding material, such as undrawn nylon or a low modulus of elasticity metal, like annealed stainless steel. As few as a single cross runway pendant may be connected to all of the loops and it may be coated with an antifriction material to facilitate lateral sliding adjustment of the connectors along it.

BRIEF DESCRIPTION OF THE DRAWING

Novel features and advantages of the present invention will become apparent to one skilled in the art from a reading of the following description in conjunction with the accompanying drawings wherein similar reference characters refer to similar parts and in which:

FIG. 1 is a front view in elevation of a portion of an aircraft arresting barrier which is one embodiment of this invention with the bottoms of the barrier loops swung up off the runway to facilitate illustration;

FIG. 2 is a top plan view of an aircraft being engaged by a number of loops of the aircraft arresting barrier shown in FIG. 1;

FIG. 3 is a top plan view of a longer disconnectable portion of the slide connectors shown in FIGS. 1 and 2;

FIG. 4 is a side view in elevation of the portion shown in FIG. 3;

FIG. 5 is a top plan view of a shorter disconnectable portion of the slide connectors shown in FIGS. 1 and 2;

FIG. 6 is a side view in elevation of the portion of the connector shown in FIG. 5;

FIG. 7 is a top plan view of interwoven and interlocked slide connector portions shown in FIGS. 2–6;

FIG. 8 is a three-dimensional view of a preliminary phase of interweaving slide connector portions to interlock them as shown in FIG. 7;

FIG. 9 is another three-dimensional view of the slide connector portions of FIG. 8 in a subsequent phase of interweaving;

FIG. 10 is a three-dimensional view of another slide connector protion connected to one of the loops of the net, which is made of yieldable material;

FIG. 11 is a top plan view of another slide connector portion for connection to the portion shown in FIGS. 3 and 4;

FIG. 12 is a side view in elevation of the slide connector portion shown in FIG. 11;

FIG. 13 is a left end view of the portion of the connector shown in FIG. 12;

FIG. 14 is an enlarged cross-sectional view taken through FIG. 12 along the line 14—14; and FIG. 15 is a partially diagrammatic side view in elevation of an unerected embodiment of this invention being engaged by a hook-equipped aircraft.

DESCRIPTION OF THE PREFERRED EMBODIMENTS

In FIG. 1 is shown a portion of a barrier net 10 suspended across airport runway 12 in position for engagement by a jet aircraft 14. Barrier net includes an upper suspension line 16 supported in a catenary across stanchions 18 at the sides of runway 12. Stanchions 18 are, for example, raised and lowered on pivoted bases 20, such as described in U.S. Pat. No. 3,468,500. Suspension line 16 is for example, made of a relatively unyielding or high modulus of elasticity textile material, such as polyester or more particularly Dacron. Dacron is the trademark for a synthetic fiber made by E. I. duPont de Nemours & Co. of Wilmington, Delaware, by the condensation of dimethyl terephthalate and ethylene glycol. Suspension line 16 is thus effectively provided by a ⅝ inch diameter, 8-strand plaited Dacron rope having a high breaking strength. Line 16 may also be provided by ⅛ inch steel cable encased in a nylon sheath.

A pair of intermediate suspension lines 22 are suspended in a substantially level line below main suspension line 16 by breakable tie loops 24 which are for example made of thin nylon or undrawn nylon. Breakable loops 24 and later described ties 30, also may be conveniently provided by a self-locking strap such as described in U.S. Pat. Nos. 205,940 and 3,186,047. Intermediate lines 22 are also detachably connected to main suspension line 16 by a similar breakable connector 24.

Barrier 10 includes a number of laterally assembled arrays 26 of loops 28 deployed in a peaked pentagonal configuration across runway 12 by looping of their peaked upper sections over suspension lines 22. A pair of breakable ties 30 hold loops 28 in position until the arrested aircraft breaks them free. One tie is secured about a portion of loop 28 near its peak and another tie 30 attaches the tail of the first-mentioned tie 30 to intermediate suspension line 22. This arrangement insures that loops 28 hold in place on line 22 without sliding wear occurring until the entire assembly is broken free by an engaged aircraft. Loops 28 are, for example, made of a relatively unyielding flexible material, such as a polyester or more particularly Dacron, having a breaking strength of approximately 10,000 lbs. Loops 28 are breakably connected side-by-side by additional breakable straps 24 which in conjunction with upper slide connections 30 maintain loops 28 deployed as shown in FIG. 1. FIG. 1 shows one array 26 of laterally connected loops 28 in solid outline. Barrier 10, however, also includes a multiplicity of staggered or laterally overlapping arrays 26, as indicated in phantom outline, by overlapping loops 28A and B shown at the righthand side of FIG. 1.

An efficient barrier net 10 for example includes approximately eighteen arrays 26 of loops evenly staggered or overlapped relative to each other across a runway, which is approximately 150 to 200 feet wide. Each loop 28 has a developed length of for example fifty feet and, in the pentagonal or house configuration shown in FIG. 1, has a width of approximately nine feet and an overall height of approximately 16 feet. Loops 28 are thus large enough to allow protruding portions of the aircraft to pass through and small enough to securely engage the larger and stronger portions of the aircraft, such as from 60–90 percent or 75–85 percent of the aircraft wingspan. Loops 28 are thus from about thirty to seventy feet in developed length or for example from fifty to sixty feet for average sized aircraft.

Slide connectors 32 are horizontally disposed on runway 12 extending in back of and substantially perpendicularly to the vertical deployment of loops 28 for a distance of approximately 5 feet in back of loop 28. This rearward disposition of slide connector 32 extends the length of loops 28 to permit nose wheel 34 of aircraft 14 to pass over horizontal linear component 36, connected to the rear of slide connectors 32, before loops 28 engage under aircraft 14. Slide connectors 32 are connected to center tails 27 of loops 28, which are gathered by ties 30, similar to those previously described.

Cross runway line or pendant 36 is connected at both sides of runway 12 to energy absorbers 38, which are for example of the type described in U.S. Pat. No. 3,172,625 having payout elements 40 of nylon tape. Pendant 36 is supported a slight distance about the surface of runway 12, for example, by annular discs 39, described in U.S. Pat. No. 3,010,683 to facilitate engagement of cross runway pendant 36 by an arresting hook 74C of an aircraft 14C so equipped (as shown in FIG. 15) when barrier net 10 is lowered out of the way. Pendant 36 is, for example, made of steel cable ½ to 1 ¼ inches in diameter or of an energy absorbing material, such as nylon or annealed stainless steel. Line 36 may also be made of braided nylon rope, twisted rope or webbing, and quite effectively of double braided nylon rope as described in U.S. Pat. No. 3,456,908. Steel pendant 36 may be advantageously coated with an antifriction material such as a slippery polymer like polyurethane, nylon or a chlorinated tetrafluoroethylene polymer, particularly Teflon made by E. I. duPont de Nemours & Co. of Wilmington, Delaware.

FIG. 2 shows how a number of individual loops 28 of different and the same arrays 26 adjust themselves on horizontal linear components 36 to engage larger dimensional portions of aircraft 14 from behind and below it. Slide connectors 32 permit a large degree of lateral sliding movement of loops 28 in engaging about the wings and fuselage of aircraft 14 behind nose wheel 34. Loops 28 thus engage the stronger larger dimensional wings of the wings and fuselage and restrain forward movement of the aircraft with minimal contact with weaker and more damage prone portions of the aircraft, such as nose wheel 34, pilot canopy 31 and/or the tail fin 15 of aircraft 14. This evenly restrains forward movement of the aircraft with a minimum of danger of damage to weaker protruding parts and to the pilot.

As shown in FIG. 2, slide connectors 32 are capable of elongation to different lengths without breaking to thus apply safe and substantially balanced forces to the portions of the aircraft engaged by loops 28. In other words, connectors 32 elongate or extend under load to vary in length between crossrunway pendant 36 and loops 28 to apply a balanced restraining force upon the portions of the aircraft which they engage. The first connectors to be stressed, therefore, elongate until the others share the load and reduce it below that at which the elongation occurs. The predetermined force level is designed to have the connectors hold within the safe holding capacity of the loop material and not to damage engaged portions of the arrested aircraft. The connectors are made to alternatively extend or hold in various ways, some of which are later described.

FIGS. 3 and 4 show elements 33 and 35 of slide connector 32 in detail with folded and stitched web 44, made for example of 10,000 lb. breaking strength polyester, extending through connecting bushing 46, for example of case polyurethane. Bushing 46 includes an axial slot 50, which for example has a T-shaped cross section to slidably receive the tail 27 end of loop 28. The outer edges of slot 50 have a rounded chamfer 52 to facilitate insertion of loop 28 through bushing 46. Web 44 is confined within groove 58 about bushing 46 under inwardly, overhanging edges 60 of flange 62. Bushing 46 has a split side provided by slot 47 for engaging and disengaging it about web 28 when installing and replacing a slide connector 32 as later described. Loops 64 are provided by stitching 65 at the free ends of webs 44 and 45 at connecting parts 33 and 35 to facilitate their coupling and uncoupling as later described.

FIGS. 3 and 4 shows details of longer slide connector element 33. Element 33 includes a nylon-stitched, folded dacron strip or web 44 which for example has three rows of stitching 66 across each triple thickness of web 44 comprised by a snake-like fold 68. The pattern of stitching, type of thread and type of stitch govern the resistance of folded web 44 to elongation under force. A predetermined force will break stitching 66 on folds 68 and allow web 44 to elongate a sufficient amount to balance the pull on various portions of an arrested aircraft. The stitching will be, for example, arranged to break at about 15-20 percent of the breaking strength of the web. For 10,000 pound strength webbing the stitches will, for example, be arranged break at a force of from about 1500-2000 pounds. The breaking points of the stitched folds vary about 10 percent from each other. The weakest folds break first. After the initially stressed connectors elongate enough to share the load with others, the force imposed upon them, drops below the breaking point. They then stop elongating and hold at about 1500- 2000 pounds of pull. As shown in FIGS. 3 and 4, folds 68 are held together by three rows of nylon thread stitching having four stitches per inch in rows which are about ¼ inch apart. A suitable thread is for example described in Mil Spec VT-295, Type 2, Class 2, Size 4/C, black color, twisted bonded nylon, Robinson Part No. PDB/277 manufactured by the Robinson Thread Co., Worcester, Mass.

FIGS. 5 and 6 show shorter slide connector portion 35 having a thick coating 70 of antifriction material, such as polyurethane, on its closed end to engage about pendant 36. Slide element 35 is relatively simple to fabricate and therefore inexpensive. Securing loops 64 are fabricated by strong nylon stitching 67 on Dacron webbing 45 (which is similar to web 44 used on connector 33). Stitching 67 has about four rows and is designed to hold under the full range of operating loads.

As shown in FIG. 7, slide connector 32 includes a longer portion or longer connector element 33 interlocked with a shorter portion of shorter connector element 35 by means of securing means provided by closed loops 64 at the open ends of slide connector portions 33 and 35. Slide connector 32 incorporates disconnectable pairs of connector elements 33 and 35 to facilitate replacement in the field after they have become permanently elongated. FIG. 7 shows slide connector 32 engaged with pendant 36 and a loop 28. If connector 32 becomes permanently elongated during an arrestment, it must be replaced before the next arrestment. The elongated longer connector 33 is removed.

As shown in FIG. 8, a new longer connector portion 33 is inserted through loops 64 of shorter connection portions 35 and the interlocking is completed as shown in FIG. 9, by passing loop 28, bushing 46 and web 44 through loops 64 at the end of web 44.

FIG. 10 shows another form of longer slide connector element 33A having only a single closed loop 64A at its end remote from bushing 46A through which extends loop 28A. Loop 64A is engaged with a shorter slide connector element 35 by interweaving and interlocking with loops 64 at the open end of a shorter slide connector 35, similar to that shown in FIGS. 8 and 9. FIG. 10 shows slide connector body 33A, for example of undrawn nylon, which elongates without breaking under a considerable range of loads. An undrawn nylon twisted rope of about one and one-half inch diameter provides about a 3000 lb. breaking strength and is therefore approximately equivalent in action to the stitched web 44 previously described. Undrawn nylon has a special type of elongation under load, which makes it particularly suitable for use as an elongatable type of connector. At approximately 25 percent elongation over its unstressed length, it restrains a load of about 40 percent of breaking strength. At 150 percent elongation, it restrains a load of about 56 percent of breaking strength. At 200 percent elongation it restrains a load of about 64 percent of breaking strength. At 300 percent elongation, it restrains a load of about 90 percent of breaking strength. An undrawn nylon connector will be designed to operate in the flat portion of its curve between about 40 and 60 percent elongation. This will provide an ultimate holding ability of about 55 percent of its breaking strength. For a one and one-half inch rope, it will therefore have an ultimate holding ability of approximately 1500 to 2000 lbs.

FIGS. 11-14 show an alternate shorter disconnectable slide connector portion 35B having a polyester strap 45B similar to strap 45 having stitching 67B similar to stitching 67 on shorter connector portion 35. Connector portion 35B however, has a polyurethane bushing 48B similar to bushing 46 on longer connector portion 33 instead of the polyurethane coating on shorter connector portion 35. Bushing 48B differs from bushing 46 in that it has a rounded slot 54B with a rounded edge 56B for receiving pendant 36B. Rounded slot 54B in bushing 48B has a rounded edge 56B about the position of horizontal line or pendant 36B to facilitate sliding movement back and forth along pendant 36B. Bushing 48B also includes extended collars or flanges 39B to hold pendant 36B above the surface of the runway to facilitate arrestment by a hook-equipped aircraft as shown in FIG. 15.

FIG. 15 shows aircraft 14C being arrested by engagement of its hook 74C with pendant 36C. Hook 74C is, for example, of the type described in U.S. Pat. No. 2,989,272. In this mode of arrestment, net 10C lies dropped on runway 12C by the lowering of stanchions 18C (not shown). The wheels of aircraft 14C including nose wheel 34C (not shown) roll over lowered net 10C and the arrestment is accomplished in the same manner as for any hook-engaged arrested landing, such as that described in U.S. Pat. No. 3,172,625 relating to energy absorbers 38C connected to the ends of pendant 36C. The illustrated system is therefore capable of either barrier net arrestment in conjunction with a cross runway pendant and energy absorber or solely pendant and energy absorber arrestment in conjunction with a hook-equipped aircraft.

I claim:

1. An aircraft arresting barrier for an airport runway having an energy absorbing device installed alongside comprising a flexible horizontal linear component for disposition across and adjacent the surface of said runway, connecting means for attaching said horizontal linear component to said energy absorbing device, an array of flexible aircraft arresting loops for disposition in a network across said runway in the path of a landing aircraft, each of said loops being large enough to permit free passage of protruding portions of said aircraft and small enough to engage larger dimensional portions of said aircraft when said aircraft impinges upon said barrier device, a suspension line for disposition across said runway a predetermined distance above the vicinity of said horizontal cross runway linear component, separable ties connecting said loops to said suspension line and to each other whereby said loops are vertically deployed in a network across said runway in position to be engaged by said aircraft, connectors attaching lower portions of said loops to said horizontal cross runway linear component to allow said loops to engage larger dimensional and stronger portions of said aircraft and to apply the restraint of said energy absorbing device to said stronger portion of said aircraft from behind and below it, and said connectors being constructed and arranged to be capable of elongating without breaking above a predetermined individual loading on initially stressed loops and of holding after a sufficient number of loops are engaged to share the applied load and reduce said individual loading below said predetermined loading whereby the loops are caused to exert substantially balanced and non-damaging restraint upon the portions of the aircraft which they engage.

2. An aircraft arresting barrier as set forth in claim 1 wherein said horizontal cross runway linear component is a single cross runway pendant.

3. An aircraft arresting barrier as set forth in claim 1 wherein said connectors comprise undrawn nylon.

4. An aircraft arresting barrier as set forth in claim 3 wherein said undrawn nylon has a characteristic of percentage of elongation versus percentage of breaking strength having a relatively flat intermediate portion, and said undrawn nylon being constructed and arranged to cause said relatively flat intermediate portion to have a breaking strength which is approximately 15–20 percent of that of the material of the loop to which each of said connectors is attached.

5. An aircraft arresting barrier as set forth in claim 1 wherein said connectors comprise stitched folded straps.

6. An aircraft arresting barrier as set forth in claim 5 wherein said stitched folded straps have a maximum of three stitched layers.

7. An aircraft arresting barrier as set forth in claim 5 wherein said straps comprise a material having a relatively high modulus of elasticity.

8. An aircraft arresting barrier as set forth in claim 7 wherein said straps comprise a polyester.

9. An aircraft arresting barrier as set forth in claim 5 wherein the stitched folded straps are constructed and arranged to break and unfold at a stress approximately 15–20 percent of the breaking strength of the material for said loops, and the breaking point of each of said stitched folded straps slightly varying from each other.

10. An aircraft arresting barrier as set forth in claim 9 wherein the breaking point of said stitched folded straps varies approximately 10 percent from each other.

11. An aircraft arresting barrier as set forth in claim 1 wherein said connectors include a disconnectable pair of open ended connector elements for facilitating installation and replacement of elongated connectors.

12. An aircraft arresting barrier as set forth in claim 11 wherein each of said disconnectable pair of open ended connector elements includes straps, and said straps having stitched folds for varying their length under applied force.

13. An aircraft arresting barrier as set forth in claim 12 wherein the open ends of said pair of connector elements incorporate securing means for connecting said open ends to each other.

14. An aircraft arresting barrier as set forth in claim 13 wherein said securing means comprise closed loops on said ends whereby said ends may be interwoven and locked together.

15. An aircraft arresting barrier as set forth in claim 11 wherein said connectors have slide connections and said slide connections have a slit side to facilitate replacement on said cross runway linear component and said loops.

16. An aircraft arresting barrier as set forth in claim 1 wherein said cross runway linear component has a coating of an antifriction material.

17. An aircraft arresting barrier as set forth in claim 16 wherein said antifriction material comprises a tough slippery polymeric material.

18. An aircraft arresting barrier as set forth in claim 1 wherein said horizontal linear component comprises a steel cable and said connectors comprise stitched folded straps.

19. An aircraft arresting apparatus for an airport runway having an energy absorbing device installed alongside comprising a flexible horizontal linear component for disposition across and adjacent the surface of said runway, connecting means attaching said horizontal linear component to said energy absorbing device, an array of flexible aircraft arresting elements for disposition in a network in the path of a landing aircraft, a suspension line for disposition across and above said runway, said aircraft arresting elements being attached to said suspension line for vertically deploying them across said runway in position to be engaged by said aircraft, connectors attaching lower portions of said aircraft arresting elements to said horizontal cross runway linear component for applying the restraint of said energy absorbing device to said aircraft arresting elements when they are engaged by a landing aircraft, and said connectors being constructed and arranged to be capable of elongating without breaking above predetermined individual loading on initially stressed aircraft arresting elements and of holding after a sufficient number of aircraft arresting elements are engaged to share the applied load and reduce said individual loading below said predetermined loading whereby said aircraft arresting elements are caused to exert substantially balanced and non-damaging restraint upon the portions of the aircraft which they engage.

20. An aircraft arresting apparatus as set forth in claim 19 wherein each of said connectors comprises a disconnectable pair of open ended connector elements for facilitating installation and replacement of elongated connectors.

21. An aircraft arresting apparatus as set forth in claim 20 wherein each of said disconnectable pair of open ended connector elements includes straps, and said straps having stitched folds for varying their length under applied force.

22. An aircraft arresting apparatus as set forth in claim 21 wherein the open ends of said pair of connector elements incorporate securing means for connecting said open ends to each other.

23. An aircraft arresting apparatus as set forth in claim 22 wherein said securing means comprise closed loops on said ends whereby said ends may be interwoven and locked together.

24. An aircraft arresting apparatus as set forth in claim 19 wherein said connectors comprise stitched folded straps.

25. An aircraft arresting apparatus as set forth in claim 24 wherein said stitched folds are constructed and arranged to break and unfold at a stress approximately 15–20 percent of the breaking strength of the material for said aircraft arresting elements and the breaking point of each said folds slightly varying from each other.

26. An aircraft arresting apparatus as set forth in claim 25 wherein the breaking point of said stitched folds varies approximately 10 percent from each other.

27. An aircraft arresting apparatus as set forth in claim 19 wherein said connectors comprise undrawn nylon.

28. An aircraft arresting apparatus as set forth in claim 27 wherein said undrawn nylon has a characteristic of percentage of elongation versus percentage of breaking strength having a relatively flat intermediate portion, and said undrawn nylon being constructed and arranged to cause said relatively flat intermediate portion to have a breaking strength which is approximately 15–20 percent of that of the material of the loop to which each of said connectors is attached.

29. An aircraft arresting apparatus as set forth in claim 19 wherein said cross runway linear component comprises a single cross runway pendant.

30. An aircraft arresting apparatus as set forth in claim 29 wherein said suspension line is supported by movable stanchions which are erected to deploy said network in the path of a landing aircraft and dropped to activate said linear component for hook arrestment.

* * * * *

UNITED STATES PATENT OFFICE
CERTIFICATE OF CORRECTION

Patent No. 3,827,660         Dated August 6, 1974

Inventor(s) Donald B. Doolittle

It is certified that error appears in the above-identified patent and that said Letters Patent are hereby corrected as shown below:

In the Abstract:

Col. 2, line 2, change "seucrely" to -- securely --;

Col. 1, line 54, after "material" change "for" to -- or --;

Col. 2, line 27, change "protion" to -- portion --;

Signed and sealed this 26th day of November 1974.

(SEAL)
Attest:

McCOY M. GIBSON JR.
Attesting Officer

C. MARSHALL DANN
Commissioner of Patents